United States Patent [19]

Kaufman

[11] Patent Number: 4,530,348
[45] Date of Patent: Jul. 23, 1985

[54] SOLAR COLLECTOR SYSTEM FOR HEATING FLUIDS

[76] Inventor: Martin H. Kaufman, Box 243, Ridgecrest, Calif. 93555

[21] Appl. No.: 478,668

[22] Filed: Mar. 25, 1983

Related U.S. Application Data

[63] Continuation-in-part of Ser. No. 1,442, Feb. 2, 1979, abandoned, which is a continuation-in-part of Ser. No. 177,384, Aug. 12, 1980, abandoned.

[51] Int. Cl.³ .................................................. F24J 3/02
[52] U.S. Cl. .................................... 126/444; 126/417; 126/450; 126/449
[58] Field of Search ............... 126/417, 438, 439, 450, 126/446, 449, 444

[56] References Cited

U.S. PATENT DOCUMENTS

| | | | |
|---|---|---|---|
| 3,968,786 | 7/1976 | Spielberg | 126/442 |
| 3,987,783 | 10/1976 | Powell | 126/450 X |
| 4,090,498 | 5/1978 | Benson | 126/425 |
| 4,094,299 | 6/1978 | Voelker | 126/442 |
| 4,158,357 | 6/1979 | Allegro | 126/450 |
| 4,328,792 | 5/1982 | Shores | 126/443 X |

Primary Examiner—Larry Jones

[57] ABSTRACT

A solar collector device comprising a truncated dome shaped absorber with inner and outer wall defining an annular space wherein fluid to be heated passes is disclosed. The absorber is placed within a curved surfaced container which is transparent to infrared radiation. In one embodiment the surface of the container opposite the transparent side is provided with a reflective coating and the container is preferably substantially evacuated to reduce heat transfer from the absorber. In another embodiment the northerly side of the absorber is thermally insulated. The absorber is preferably black surfaced and when constructed of coiled tubing, the tubing is coiled in a cylindrical or domed configuration of one or more coils, and solar reflectors are positioned to provide reflected radiation to those sides of the absorber not receiving direct sunshine.

15 Claims, 9 Drawing Figures

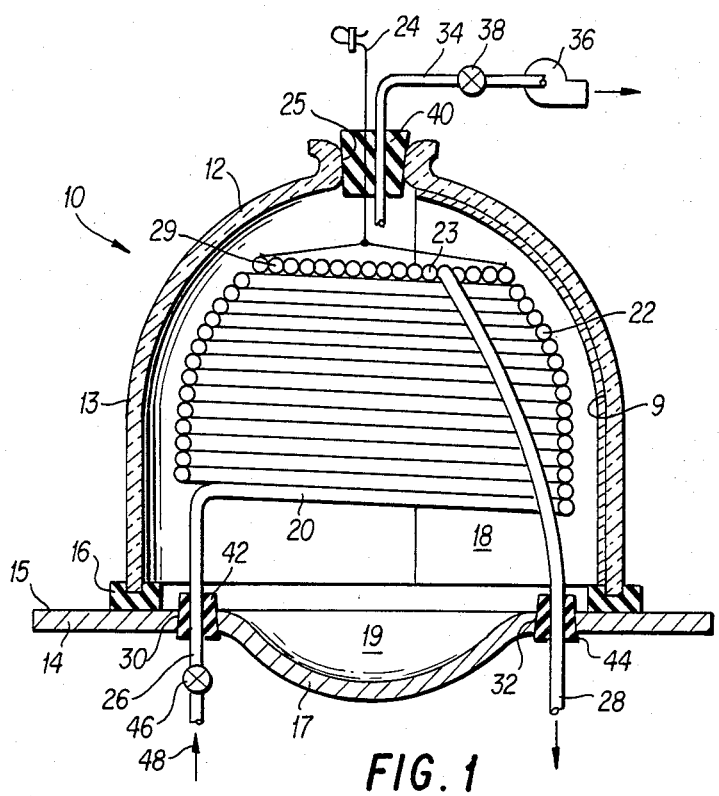
FIG. 1
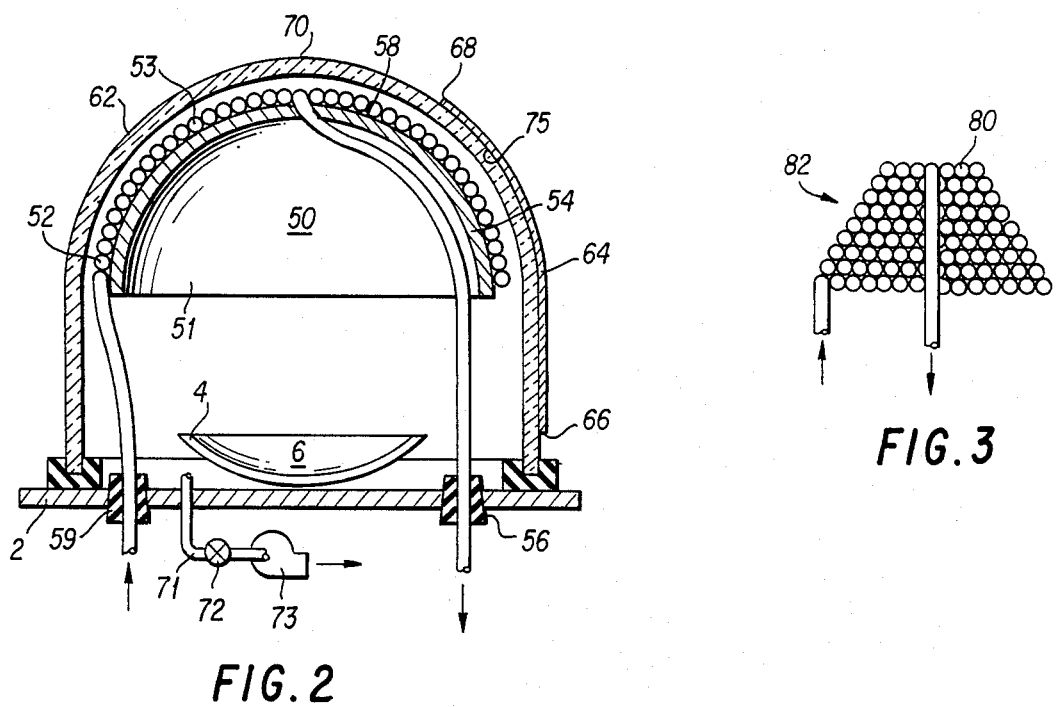
FIG. 2
FIG. 3

SOLAR COLLECTOR SYSTEM FOR HEATING FLUIDS

The present application is a continuation-in-part of parent application Ser. No. 1,422 filed Feb. 2, 1979, now abandoned and of continuation-in-part application Ser. No. 177,384 filed Aug. 12, 1980, now abandoned.

FIELD OF INVENTION

This invention relates to a solar heating system, and more particularly to a solar heat collector for heating fluids.

BACKGROUND

While many inventors have worked in this art and have contributed numerous constructions, so far as I know, there is not today in existence a truly efficient, light weight solar collector for heating fluids, that may be manufactured effectively and inexpensively, and which takes up a small amount of area in the horizontal plane by extending upwards or vertically from a compact base. For example, the U.S. Department of Commerce Technical Information Service publication PB-237042, page 49 (1974) states that the total material cost for a flat plate collector for use, for example, in a single family residence is about $3000 while installation costs for such a collector system is over $2000.

The Dow Corning Corporation publication of 1977 entitled, "Dow Corning Silicones Bring Solar Energy Down to Earth," discusses solar systems employing flat plate glass covered collectors used to solar heat heat-transfer liquids. A commercial concern, Mor-Flo Industries, Inc. of 18450 S. Miles Road, Cleveland, Ohio 44128 has published a brochure entitled, "Now. Hot Water for Everybody Under the Sun," in which a typical flat plate collector is illustrated.

Solar collector designs generally comprise a black surfaced radiation absorber covered with one or more pieces of flat plate glass or plastic. The covers may be coated with antireflection layers.

Flat plate glass covers are used in conjunction with several different materials for seals, connections, insulation and the like. The use of varied materials cause operational problems concerned with the different values of coefficient of expansion. The necessary add ons raise the cost considerably.

The known absorbers which are relatively flat and sometimes have fins usually contain within their passages glycol or other common heat exchange fluids. Often the passages for these fluids cause the flat plate absorber to have protuberances in places.

The amount of solar energy collected by these relatively flat absorber plates varies with the season and the hour of the day. Although the solar heat collectors may be designed to move and tilt from the horizontal to obtain maximum impingence of solar rays throughout the day, such a system is very costly and therefore flat absorbers are often fixed in place, lowering their efficiencies. The homeowner using them generally sets them at a fixed tilt angle.

When the absorber plate gets hot, it emits radiation which is a heat loss to the system. Air between the flat glass or plastic cover plate and the absorber conducts heat from the absorber to the cover and then to the outside air. This is another heat loss of the system.

Solar reflectors exposed to the weather and environment are damaged by wind carried particles, chemical species in the air and impure rain drops which all alter the reflector's surface and substantially reduce its reflection efficiency and capability.

On Page 43 of Antonin Vasko's book entitled "Infrared Radiation," published by the Chemical Rubber Company Press, Cleveland, Ohio, 1968, is stated that the characteristic of blacks is high absorptance, which with superior blacks can be as great as 99%. Efficiently absorbing blacks for solar absorber purposes are available commercially. Aluminum surfaces may be made black be anodizing. Many metal sulfides are black.

SUMMARY OF THE INVENTION

A workable, unique, economical, solar collector device has been invented which collects solar radiation regardless of the hour of daylight or day of the year. One embodiment has an integral solar reflector and an upright infrared reflector, neither of which is subjected to the ravages of the weather, and a curved shaped, clear or frosted infrared transmitting enclosure which remains substantially cool to the touch, and which may be evacuated. Another embodiment has an absorber of truncated dome shape with an inner and outer wall which define an annular space between said walls wherein fluid passes and is heated.

BRIEF DESCRIPTION OF THE DRAWINGS

FIG. 1 is a cross sectional view of a first embodiment of the invention taken along an axis of symmetry;

FIG. 2 is a similar view to FIG. 1 of a modified base, absorber, enclosure, reflector, base reflector, and enclosure useable with the invention according to FIG. 1;

FIG. 3 is a similar view of yet another modification of the absorber unit.

FIG. 6b is an enlarged top view cut typical of FIG. 6a.

DESCRIPTION OF THE PREFERRED EMBODIMENTS

Figure 4A:
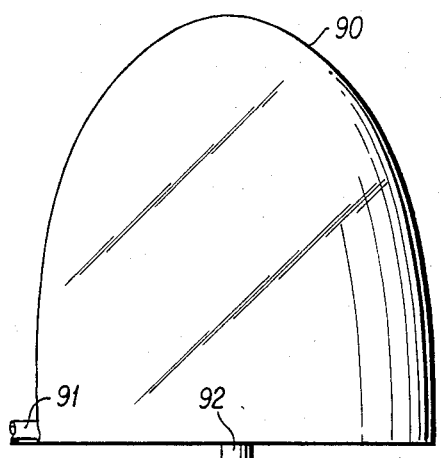
FIGS. 4 and 5 show still other embodiments of the present invention. Only the absorber is shown in these figures.

In FIG. 1, a unique solar collector device 10 is shown. The container or cylinder 12 comprises an infrared transparent dome or enclosure 13 a base 14 by a gasket 16. The base 14 is shown with a dished-face or concave or parabolic portion 17 whose inner surface 19 reflects and focuses solar radiation to the absorber 20. The inner surface 19 of the concave portion 17 may be polished metal, or may be coated or plated with a reflective material. Approximately half of the inner surface 9 of the dome 13 is shown coated or plated with a reflective surface as indicated at 18. This surface 18 may be provided in any well known manner to produce a surface mirror effect which reflects infrared radiation incident on it.

The absorber 20 is suspended within container 12 and in this embodiment, is shown as a single length of tubing 22 coiled substantially in the shape of a dome and in this embodiment the top portion of the dome shape 23 is shown substantially flattened wherein this substantially flattened portion comprises a horizontal layer 29 of the tubing 22 tightly coiled. Absorber 20 is suspended in this embodiment by a cable 24 passing through a seal 40 which seals opening 25 in the top of dome 13. Absorber 20 is also partially supported and fixed in position by the ends of the tubing 26, 28, passing through holes 30, 32, respectively, in the flat lip portion 15 of base 14. A check valve 46 is incorporated in tubing end 26 to allow fluid flowing through tubing 22 to flow only in the direction indicated by the arrow 48.

A conduit is shown passing through top opening 25. This conduit 34 is provided for connection to a vacuum pump 36 through a valve 38 so that the container 12 with base 14 may be evacuated of as much air as desired and possible. For this reason also, the openings 30, 25, 32 are sealed. The top opening 25 is closed by seal 40 and the bottom openings 30, 32 are closed by seals 42, 44, respectively. In the event the solar collector system 10 is desired to operate without evacuation, conduit 34 may be removed from seal 40.

In FIG. 2, the base 2 is flat. In this embodiment a separate dished solar reflector 4 is positioned on base 2 so that its reflecting surface 6 reflects and focuses solar radiation onto the surface 50 of hollow portion 51 of mandrel 54. The surface 50 efficiently absorbs radiation reflected by reflecting surface 6. Tubing 52 which efficiently absorbs solar radiation is coiled and intimately fixed on the outer surface 58 of mandrel 54. In this embodiment the mandrel 54 and coiled tubing 53 is suspended, supported and fixed in place by means of seals 59 and 56 which themselves may be supported outside the enclosure and base by means that are well known. In this embodiment about 35% of the outer surface of the substantially curved shaped infrared transmitting cover 62 is covered with a reflective material 64. This reflective material 64, which may be a shiny metal, extends from about the bottom 66 of the container 62 to about 80% of the distance 68 to the top 70 of the container 62. The reflective surface 75 of the reflective material 64 is arranged to face tubing 52 which efficiently absorbs radiation.

In this embodiment a conduit 71 is provided for connection to a valve 72 and then to a vacuum pump 73 so that the container 62 with base 2 may be evacuated. The conduit 71 is here shown passing through base 2.

In FIG. 3 the coil of tubing 80 which efficiently absorbs solar radiation for the absorber 82 comprises a plurality of rows of the tubing 80 tightly coiled.

In the U.S.A. the location of the sun is substantially southerly. Only about 60% of the surface 90 of FIGS. 4a and b receive direct solar radiation. That portion of the surface 90 receiving substantially no direct radiation has been removed in FIGS. 5a, its cross sectional view 5b, slightly more detailed and complete FIG. 6a and the enlarged top view cut FIG. 6b. However, nevertheless, this truncated version has certain advantages over all other aforedescribed embodiments, and this embodiment is preferred. Throughout the sunlight hours some part of the absorber surface receives solar radiation which is normal to its surface. Moreover, if the radius of 90' is large, the surface will cast its shadow upon itself only during the early or late hours. The absorber needn't be operating during those hours although an overall heat gain would still occur where it to operate. If the radius is infinitely large, no absorber shadow will be cast upon itself since the surface would then be flat. Substantially less material is required for the fabrication of the truncated embodiment. An outer black surfaced flat sheet parallel to an inner flat sheet defining a space between them wherein fluid flows and rises to reach an apex where it falls through a tube to exit is a workable version of the present invention. Such a version can have spacers or ribs within said space to help guide the flow of fluid.

The truncated dome version can be manufactured economically from single walled metal or metal dome shape wherein one side is pushed in to provide the inner wall 94' and the space 93' for fluid flow. By dome is meant a geometrically curved surface such as hemispherical, elliptical, parabolic, and the like, as well as elements capped with such curved surfaces.

Figure 4B:
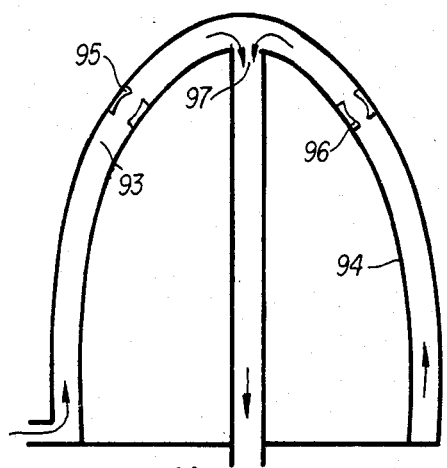
Figure 5A:
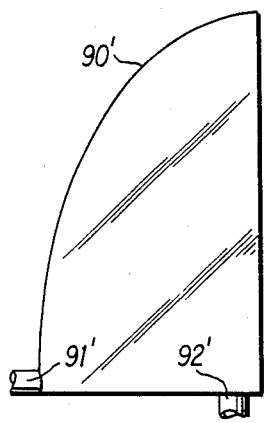
Figure 5B:
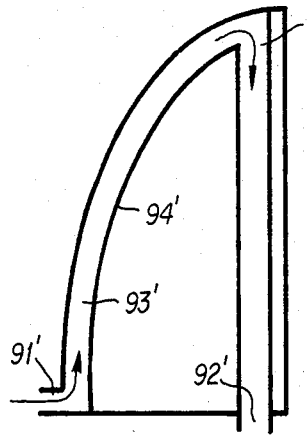
Figure 6A:
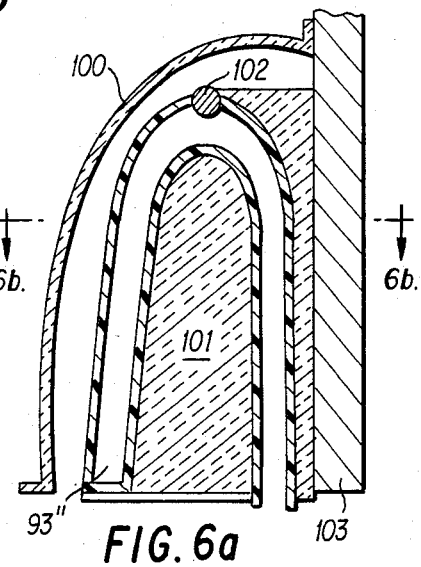
FIG. 6a shows slightly more detail of the truncated dome version than FIGS. 5a and b, and includes the infrared transparent cover, the support, the atmospheric valve and insulation.
Figure 6B:
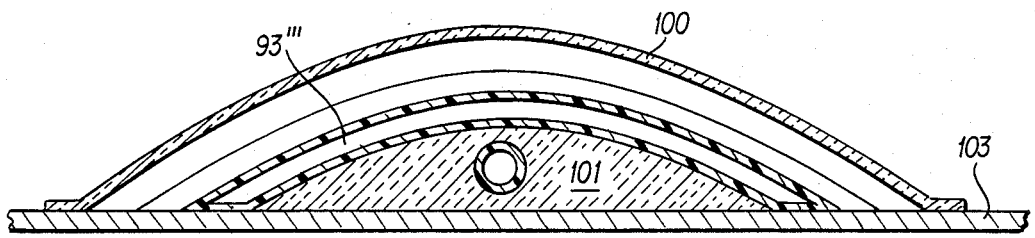

The outer surfaces of the outer walls of the absorber embodiments shown in FIGS. 4, 5, and 6 are black and absorb solar radiation. The inner curved wall 94 and 94' and outer wall 90, 90' define an annular space 93, 93' between them. In FIGS. 6a and 6b the annular space is designated 93" and 93"', respectively. Although the annular space may have more than one entry, for illustrative clarity only one entry 91 is shown. For the same reason only two spacers 95 and 96 are shown and only in FIG. 4b at that. The spacers help to maintain annular space integrity, provide ties between inner and outer walls, and provide some control over the rate and course of fluid flow. The action of the fluid is the same in the different views of FIGS. 4 through 6. The fluid to be heated enters at 91, travels through annular space 93, and then rises until it reaches apex 97 where it falls through the discharge passage and exits the absorber at 92. For the sake of illustrative clarity only the absorber is illustrated in FIGS. 4a, 4b, 5a, and 5b.

FIG. 6a is a cross sectional view of my truncated dome embodiment, showing slightly more detail than previously. 100 is an infrared transparent material which is, in fact, a cover to protect the absorber from the elements. It is designed for easy installation by the home owner. There is an insulating space between the cover and the absorber surface. The space may be evacuated or simply be a dead air space.

The fluid enters the bottom region of annular apace 93", rises to reach the apex, and drops to exit either to an insulated storage tank or to be recirculated through the absorber. The fluid can be circulated through the absorber and storage tank by arranging for thermosiphoning by means known to the art or a low horse power circulating pump, for instance, from about 1/5 horsepower to about 1/25 horsepower, can be used.

The absorbers shown in FIGS. 4, 5, and 6 can be fabricated of metals and plastics. Copper, the preferred metal because of its high thermal conductivity, may be less suitable than steel, aluminum, and others based upon cost. When water containing dissolved salts or chloride is the fluid being heated, a thin coating of polymeric material on those metal surfaces that would normally be contacted by the water may help deter corrosion. Most household waters contain dissolved salts. Although moldable organic polymers and copolymers and the like have very low thermal conductivities compared to metals, they are less dense and often much more economical. Useful absorbers can be economically fabricated from such materials.

The conductivities are raised by loading the polymers with powders and flours which have higher thermal conductivities than the polymers. This lowers the cost since the powders used are less costly than the polymeric materials. Since the outer surface of the absorber must be absorptive to solar radiation, black powders can be used for loading, for instance, carbon and graphite, black iron oxide, black metal sulfides, and other black powders known to the art. Such black loading materials may be sufficient to render the absorber efficient for absorbing. Moreover, the surface of the absorber can be painted black or colored black by other means known to the art. Lighter colored materials may also be used for loading, or any combination of the light and dark colored powders may be used for loading. Alumina and silica, for example, are light colored and have relatively high thermal conductivities compared to plastic materials, and they are economical.

The addition of carbon blacks and graphite have a beneficial effect on the stability of the plastic materials. Ultraviolet radiation, particularly in the presence of oxygen and ozone, is deleterious to most plastics. Carbon black protects against ultraviolet initiated damage.

Thermoplastic materials are preferred and there are many known to the art, for example, ABS which is a polymer derived from combination of acrylonitrile, butadiene, and styrene; nylons; polyesters; polycarbonates; some polyhydrocarbons; polyphenylene oxide; polysulfones and the like.

The smaller the radius of the truncated dome base, the greater the wall curvature and the greater the amount of surface in shadow during the early and late sunlight hours. A truncated dome section of very large radius like that shown in FIG. 6b will have one outer edge of absorber front surface in absorber shadow in the very early hours and the opposite edge in absorber shadow during the late hours. That is not considered overly detrimental.

The curved shape has advantages in economy and construction. For example, a curved infrared transparent cover can be attached directly to a simple backboard or support with a few screws or screws and flange clamps, with or without a gasket, with however, ample space between it and the support for the absorber. A flat cover, on the other hand, would require boxlike construction to allow room for the absorber, usually a more costly arrangement.

For the above reasons, a truncated dome shape of very large radius, approaching flat plates, is preferred. The bulge, which is the distance out from a flat support, will be smaller for the absorber and for the cover. As a result, the shadow cast by the absorber on itself during early and late hours will be small. Attachment of the absorber with insulation in its back hollow onto the support will be simplified and economical. Moreover, it is understood that reflectors may be used to increase total radiation striking the absorber.

In general, the purchase price of a solar collector is a significant capital expense for the home owner. If the collector is costly to manufacture, its selling price will be high. Cost may be reduced if assembly of components is done by the home owner. But if the home owner must hire a plumber or electrician, once again costs rise. A flat plate collector which tracks the sun may be very efficient, but it is costly, too. Moreover, efficiency is not too important to a home owner if he saves money on heating water, and if he gets the water he needs, and the capital outlay isn't too great. He usually doesn't use that much hot water and certainly not continuously. It is a principle object of the present invention to provide a new, economical and improved solar heating device which can be economically manufactured and designed so that assembly of components is simple, not requiring the help of skilled craftspeople.

A further object is to provide a large volume of stored hot fluid, more particularly water, by means of continuously circulating the fluid during the daylight hours from an insulated storage tank or vessel through the absorber of said solar collector system and back to the storage tank whereby the circulated stored fluid gets hotter and hotter. A further object is to provide an absorber which can be subjected to solar radiation from early morning to late evening during all seasons of the year. A still further object is to provide a solar heat device which may be scaled to a size consistent with hot fluid needs and which may be used in series and parallel with multiple units of said solar heat device or system. A still further object is to provide a solar heat system whose function is not substantially deteriorated by the ravages of the environment and which may be inexpensively fabricated. A still further object is to provide a container for the absorber which remains substantially cool during operation of the system and which may be evacuated.

The hot water from the reservoir or storage tank could be used for several practical applications, for example, circulated through a heat exchanger within the duct of a residential heating/cooling system, used directly for bath and shower, used in connection with a conventional residential water heater, used to supply heat to a refrigerator system. Hot fluid coming directly out of the absorber tubing may be used to drive a turbine, for example, if the hot fluid is gaseous. In many cases the hot water or other fluids, for example, solutions, glycols, gases may be recirculated to the storage reservoir. By means, methods and components known to the art like venting, pressure equalization, pressure and temperature relief, insulation, expansion brackets, automatic controls such as valves, check valves, heat sensors, expansion tanks, thermostats, compressors, light detectors the entire system comprising the solar collector system, storage reservoir, automatic controls can be made to dispense hot fluid automatically.

In accordance with the present invention it has been unexpectedly found that the curved portions of a container of ordinary glass remains substantially cooler than a flat glass plate used to cover or enclose an absorber. In fact, my experiments with an ordinary, shallow, flat, rectangular, pyrex casserole dish used as a container for an absorber revealed that even the curved and rounded corners of said dish were substantially cooler to the touch than any of the flat areas of said dish. I have found that containers of completely and substantially curved ordinary glass shaped like hemispheres, parabolas, upright long and short cylinders, upright long and short cylinders with flat and curved end closures, frustrums of cones, hollowed sections of solid elipses were all cooler to the touch than flat plate glass or flat plastic covers. It is not clear what the reason for this effect is.

In accordance with the present invention it has also been unexpectedly found that frosted and pitted containers or covers do not substantially reduce useful solar gain to the absorber. In fact, my experiments revealed that the absorbers used in conjunction with frosted, rough surfaced, transluscent, substantially infrared transparent containers were only about five percent lower in temperature in the sun when compared to substantially infrared transparent containers which have smooth surfaces and which are transparent. Thick, unpolished, frosted, pressed glass is therefore practical for containers and for absorber cover applications. This is considered an important economic factor in solar heat collector system manufacture.

Glass and plastic materials such as polycarbonates, polysulfones, polyethersulfones, polymethylmethacrylate, polyacrylates, cured polyesters, polyhydrocarbonpolyesters, molecular combinations of these like copolymers and terepolymers and the like transmit infrared radiation. Plastics are usually softer than glass and are usually affected by ultraviolet radiation. Glass containers are preferred from the point of view that they do not deteriorate from ultraviolet radiation. However, ease of breakage may be an important factor. Plastics do not easily shatter under ordinary conditions. Moreover, plastic materials are lighter and economical to fabricate into curved shapes. Polyacrylates, polymethacrylates, polycarbonates and polyesters, for instance, can be used since they are stong materials. The addition of ultraviolet absorbers and stabilizers to the plastics confer ultraviolet stability. There are many ultraviolet absorbers and stabilizers known to the art, for example, benzophenones, substituted 2-hydroxybenzophenones, and benzotriazoles.

The axis of rotation of the earth is about 23.5 degrees from the plane of the earth's orbit. In the northern latitudes, north of the tropic of cancer, the sun never reaches the zenith. Because of these relationships between the position of the sun and earth, a dome sitting in the northern hemisphere will not receive on an annual basis equal solar radiation on different parts of its surface. There will be times of the year and day when the north side of the dome will receive no solar radiation at all. On an annual basis it is estimated that the north half of the dome will receive less than half of the radiation received by the south side of the dome. Considering 50%, 40%, 30%, 20% and then 10% of the surface of the dome's north side, the solar radiation received drops off very rapidly with each 10% decrease of the surface considered. Over the course of a year at an average latitude of 34 degrees, the northern most side of the dome receives on the order of 5% of the radiation incident on the dome. On the order of 10% of the northern dome surface receives no incident solar radiation at all. An infrared transmitting container shaped to receiving solar radiation from 360 degrees, i.e., east, west, north, and south, may have up to 50% of its surface covered, preventing solar radiation from entering on one side without significantly reducing the solar collecting efficiency of a solar collector absorber enclosed within it. A reflector whose reflecting surface is arranged to face the absorber on the north side of the container prevents solar radiation from entering that side, the side covered by said reflector, but in so doing substantial radiation emitted from the hot absorber escapes from the container. In my more practical and economical embodiment the north side of the absorber is thermally insulated. This prevents heat loss from the absorber. Of course, reflectors can still be used on the sides.

The version of my solar collector system whose absorber has a flat inner wall which is thermally insulated on the outside, which is the side which faces away from the sun, is black just like the other versions, particularly the absorbing surface, the surface of the flat outer wall. The two walls define a space between them for fluid flow. It is best if the two walls are parallel to each other. The fluid, for example, water, will flow through this version similarly to the other versions, entering at the bottom, rising to an apex, and exiting by gravity.

In still another version the top portions of the two flat plates are curved in the direction of the collector's back support which is behind the insulation. A side view cut of this version will resemble FIG. 6a. In either of these flat walled versions the ultraviolet stable, infrared transparent cover can be curved for economical manufacture and economical installation.

I claim:

1. A solar heating device for heating a fluid comprising a solar absorber composed of concentric arclike layers having radii and an abutting face with a midpoint such that the abutting face defines two chords at its midpoint, one subtending the outer layer which absorbs solar radiation and the other subtending the inner layer, both chords much smaller than the radii of said layers, the difference between said radii being much smaller than the smallest of said chords, said difference defining a space between said layers, said space having at least one entrance, at least one exit and an apex, so that said fluid enters through said entrance and travels through said space and rises to said apex and exits through said exit, and wherein said absorber is fabricated substantially from polymeric material compounded with additives whose thermal conductivities are higher than the thermal conductivity of said polymeric material, and said additives exhibit high absorptivity of solar radiation.

2. The solar heater of claim 1 wherein an ultraviolet stable infrared transparent material is mounted externally to said outer layer and defining an insulating space between said infrared transparent material and said outer layer.

3. The solar heater of claim 1 wherein the side of said absorber which faces away from the sun is insulated to minimize heat loss from said absorber.

4. A solar heating device according to claim 1 wherein said additives are substantially comprised of combinations of black iron oxide, carbon blacks, graphite, alumina and silica.

5. A solar heating device according to claim 4 wherein the highest point on the absorber contains an atmospheric valve which closes when the fluid is flowing in said space and opens to admit atmospheric air when the fluid stops flowing.

6. A solar heating device according to claim 1 wherein reflectors direct reflected sunlight to the absorbing surface.

7. A solar absorber according to claim 1 which includes a device which allows said absorber to empty of fluid when said fluid ceases flowing.

8. A solar absorber according to claim 1 wherein said additives include at least one of the following: black iron oxide, carbon blacks, graphite, alumina, silica.

9. A solar heating device comprising a hollow container consisting essentially of an infrared transparent material in combination with a solar absorber within said container, said absorber comprising outer and inner layers having coniclike surfaces of substantially similar shape, said layers having an abutting face and an abutting base such that said base defines arcs having radii, the difference between said radii much smaller than said radii, said difference defining a passage between said layers, said passage having an apex, at least one exit and at least one entrance, said exit arranged so that fluid can be adjusted to flow through said passage, wherein said outer layer absorbs solar radiation, and whereby fluid rises through said passage and exits after reaching the apex, and wherein said absorber is fabricated substantially from polymeric material compounded with additives whose thermal conductivities are higher than the thermal conductivity of said polymeric material and at least one of said additives exhibits high absorptivity of solar radiation.

10. A solar absorber according to claim 9 wherein said inner layer is thermally insulated.

11. A solar absorber according to claim 9 wherein the absorber contains a device for allowing said fluid to exit said passage when fluid stops flowing.

12. A solar absorber according to claim 9 wherein at least one of said additives is black.

13. A solar absorber according to claim 9 wherein said additives are substantially comprised of materials which include at least one of the following: black iron oxide, carbon black, graphite, alumina, silica.

14. A solar absorber according to claim 9 wherein said polymeric material is of a type capable of being shaped by at least one of the following: vacuum forming, rotomolding, blow molding, polymeric welding.

15. A solar heating device according to claim 9 wherein at least one of said additives is black.

* * * * *